United States Patent
Jozefov et al.

(10) Patent No.: US 12,238,400 B1
(45) Date of Patent: Feb. 25, 2025

(54) DYNAMIC FLEXIBLE PRINTED CIRCUIT FOR A TIP TILT OIS CAMERA MODULE

(71) Applicant: Apple Inc., Cupertino, CA (US)

(72) Inventors: Andrew S Jozefov, Palo Alto, CA (US); Zachary W Birnbaum, Saratoga, CA (US); Scott W Miller, Los Gatos, CA (US)

(73) Assignee: Apple Inc., Cupertino, CA (US)

( * ) Notice: Subject to any disclaimer, the term of this patent is extended or adjusted under 35 U.S.C. 154(b) by 278 days.

(21) Appl. No.: 17/664,371

(22) Filed: May 20, 2022

Related U.S. Application Data

(60) Provisional application No. 63/209,874, filed on Jun. 11, 2021.

(51) Int. Cl.
*H04N 23/57* (2023.01)
*H04N 23/695* (2023.01)

(52) U.S. Cl.
CPC .......... *H04N 23/57* (2023.01); *H04N 23/695* (2023.01)

(58) Field of Classification Search
CPC .............................. H04N 23/57; H04N 23/695
See application file for complete search history.

(56) References Cited

U.S. PATENT DOCUMENTS

| | | | |
|---|---|---|---|
| 8,442,392 B2 | 5/2013 | Ollila et al. | |
| 2008/0218623 A1* | 9/2008 | Lo | G03B 13/00 348/E7.091 |
| 2018/0284569 A1* | 10/2018 | Minamisawa | G02B 27/646 |
| 2019/0104239 A1 | 4/2019 | Aschwanden et al. | |
| 2020/0412927 A1 | 12/2020 | Platner et al. | |
| 2022/0174189 A1* | 6/2022 | Kuo | G03B 3/10 |

* cited by examiner

*Primary Examiner* — Mekonnen D Dagnew
(74) *Attorney, Agent, or Firm* — Robert C. Kowert; Kowert, Hood, Munyon, Rankin & Goetzel, P.C.

(57) ABSTRACT

A device may include a tip tilt camera module and a dynamic flexible printed circuit structure. The camera module as a whole may tilt around one or more axes. Within the camera module, the camera module may include one or more lenses and an image sensor, whereby the relative position between the lenses and image sensor may be adjustable. The printed circuit structure may provide an electrical connection between the camera module and one or more other components of the device outside the camera module. The printed circuit structure may include one or more flexible portions, at least one portion of which may be placed in torsion during rotation of the camera module.

20 Claims, 9 Drawing Sheets

| Portion | Rotation axis | |
|---|---|---|
| | X | Y |
| A | Fixed | |
| B | Shear | Torsion |
| C | Torsion | Shear |
| D | Shear | Torsion |
| E | Rigid connection to the camera module | |

DYNAMIC FLEXIBLE PRINTED CIRCUIT FOR A TIP TILT OIS CAMERA MODULE

This application claims benefit of priority to U.S. Provisional Application Ser. No. 63/209,874, entitled "Dynamic Flexible Printed Circuit for a Tip Tilt OIS Camera Module," filed Jun. 11, 2021, and which is hereby incorporated herein by reference in its entirety.

BACKGROUND

Technical Field

This disclosure relates generally to a device and more specifically to a device that uses a dynamic flexible printed circuit structure to facilitate implementation of tip and tilt functions for a camera module.

Description of the Related Art

Mobile multipurpose devices such as smartphones, tablets, and/or pad devices are considered as a necessity nowadays. They integrate various functionalities in one small package thus providing tremendous convenience for use. Most, if not all, of today's mobile multipurpose devices include at least one camera. The advent of the mobile multipurpose devices has resulted in a drive for improved optical and image stabilization performance in increasingly compact devices. Traditional OIS, or optical image stabilization, camera modules translate the lens relative to the image sensor to prevent optical distortion and produce stable images in the presence of a disturbance. However, such OIS camera modules can only provide limited angle rotation and adjustment. Thus, it is desirable for techniques to implement camera modules with larger rotational angles for OIS compensation.

Figure 1:
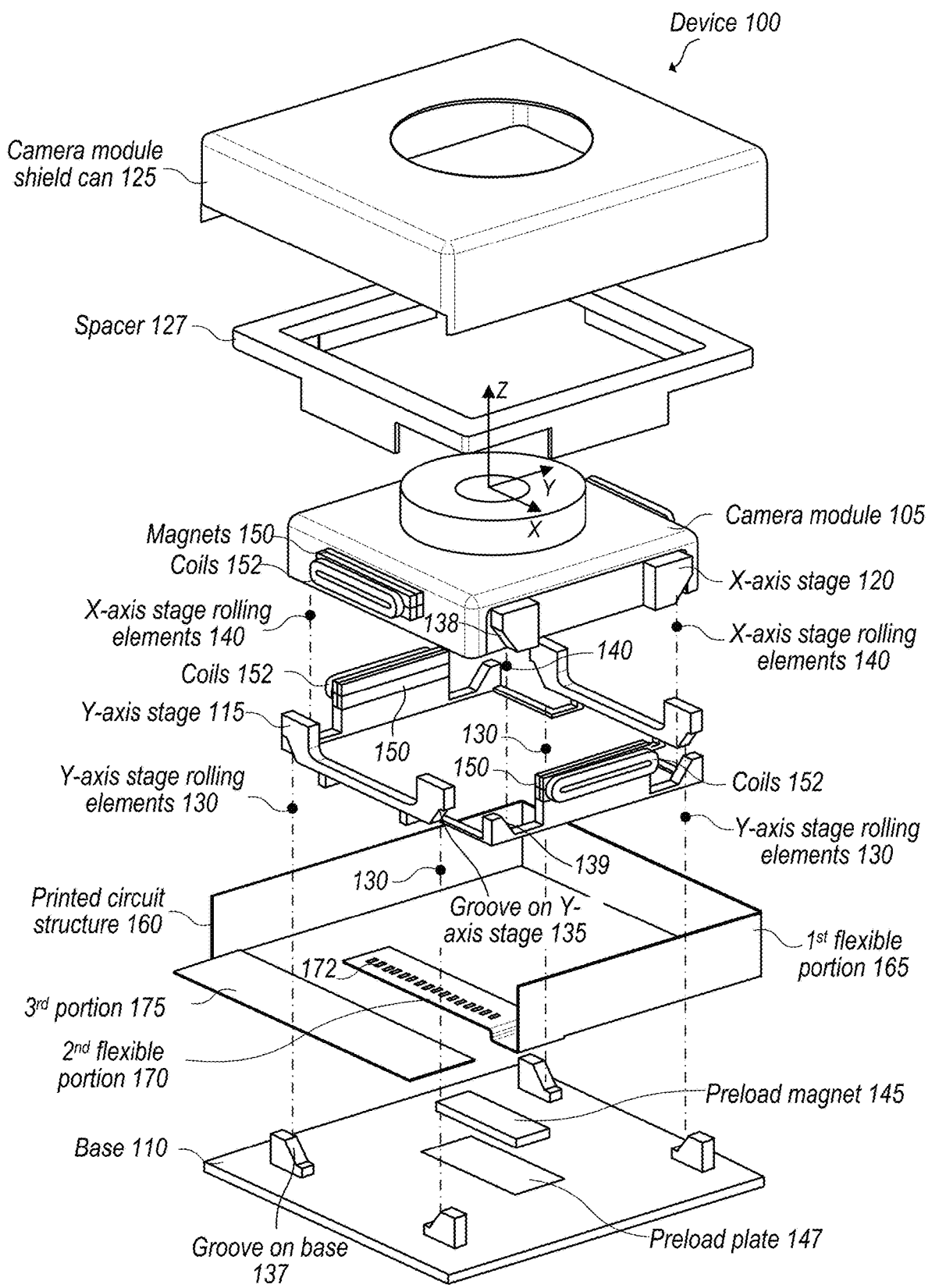
FIG. 1 shows an example device including a tip tilt camera module and a dynamic flexible printed circuit, according to some embodiments.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the appended claims, this term does not foreclose additional structure or steps. Consider a claim that recites: "An apparatus comprising one or more processor units . . . ." Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112(f) for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the intended scope. The first contact and the second contact are both contacts, but they are not the same contact.

The terminology used in the description herein is for the purpose of describing particular embodiments only and is not intended to be limiting. As used in the description and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

DETAILED DESCRIPTION

Various embodiments described herein relate to a printed circuit structure of a device that may be used to facilitate implementation of tip and tilt functions for a camera module of the device. In some embodiments, the device may be a mobile multipurpose device, such as a smartphone, tablet, pad device, and the like, inside which the camera module may be included. The camera module may include one or more lenses and an image sensor. The camera module, as a whole, may be able to rotate around one or more axes (e.g., X and/or Y-axis) orthogonal to an optical axis of one or more lenses of the camera module (e.g., Z-axis). This may provide optical image stabilization (OIS) where the camera module may stay at a fixed position relative to an object in the environment, and both the lenses and the image sensor within the camera module may rotate (together) around the one or more axes to a specific angle. When the camera module has two rotational degrees of freedom for OIS compensation, in no particular order one may be referred to as tip and the other as tilt. In addition, within the camera module, the relative position between the image sensor and the one or more lenses of the camera module may also be adjustable to implement some further functions. For instance, a focal distance between the lenses and image sensor may be adjustable along the optical axis (e.g., Z-axis) to implement an autofocus (AF) function. In addition, in some embodiments, the lenses and/or the image sensor may be also movable laterally along the one or more axes (e.g., X- and/or Y-axis) orthogonal to the optical axis to perform additional optical image stabilization (OIS) to compensate for unwanted lateral movement between the lenses and image sensor.

In some embodiments, it may be needed to route electrical signals from/to the camera module to/from one or more components of the device that are outside the camera module. For instance, in some embodiments, power and ground signals may need to be routed between the image sensor or power supplies within the camera module and a battery or other power supplies outside the camera module. In addition, in some embodiments, image signals generated from the image sensor such as electrical signals may need to be transmitted from the image sensor to an image processor outside the camera module for signal processing. Moreover, in some embodiments, one or more other electrical signals may need to be delivered between the one or more outside components and the camera module to perform other operations of the camera module. In some embodiments, the device may use the printed circuit structure, such as a dynamic flexible printed circuit, as an electrical connection to implement transfer of the electrical signals between the camera module and outside components. Further, for performance of the tilt functions, it is also important that the printed circuit structure may not significantly hinder rotation of the camera module. Thus, in some embodiments, it may be desirable that during the rotation of the camera module the printed circuit structure may exhibit relative low stiffness and resistance.

In some embodiments, the printed circuit structure may include a first flexible portion arranged to surround an outside perimeter of the camera module. For instance, the camera module may be enclosed inside a housing, and the first flexible portion may be a flexible printed circuit in a U-shape that wraps around the housing of the camera module from outside along the one or more axes (e.g., X- and/or Y-axis) orthogonal to the optical axis (e.g., Z-axis). In addition, the printed circuit structure may further include a second flexible portion, one portion of which may be attached to the camera module and another portion to the first flexible portion (e.g., the U-shape portion). The attachment of the second flexible portion with the camera module may be implemented using anisotropic conductive film (ACF), according to some embodiments. When the portion of the second flexible portion is attached to a rigid or stiff part of the camera module, at least that portion of the second flexible portion at the attachment may become "rigid" as well. The first and second flexible portions of the printed circuit structure may be one single flexible printed circuit, or may be two or more separate flexible printed circuits joined altogether (e.g., using ACF), according to some embodiments. Alternatively, in some embodiments, the second portion of the printed circuit structure may be a rigid printed circuit or a combination of rigid and flexible printed circuit (e.g., a rigid-flex printed circuit). As a result, the second flexible portion of the printed circuit structure may connect the camera module, electrically and mechanically, with the first flexible portion (e.g., the U-shape portion) of the printed circuit structure.

In some embodiments, the printed circuit structure may further include a third portion which may be fixed and rigidly attached to a stationary portion of the mobile multipurpose device (outside the camera module) to connect the stationary portion of the mobile multipurpose device, electrically and mechanically, with the first flexible portion of the flexible printed circuit. A stationary portion may refer to a part of the mobile multipurpose device that may supposedly stay fixed and not move on purpose during rotation of the camera module. In some embodiments, the stationary portion of the mobile multipurpose device may be a fixed flexible printed circuit, an electrical input/output (I/O) interface, or other fixed components outside the camera module. Thus, the printed circuit structure, including the first, second and third portions, may form an electrical and mechanical connection between the camera module and the stationary portion outside the camera module. Electrical signals may hence be routed from/to the camera module through the printed circuit structure to/from the stationary portion, and further from/to the stationary portion to/from the one or more components of the device outside the camera module. In some embodiments, the third portion may be a flexible printed circuit, a rigid printed circuit, or a combination of both such as a rigid-flex printed circuit. In some embodiments, the printed circuit structure including the first, second, and third portion may be one single piece of a flexible printed circuit. Alternatively, in some embodiments, the printed circuit structure may include multiple separate printed circuits (e.g., flexible, rigid and/or rigid-flex circuits) joined together.

Given that the printed circuit structure is mechanically connected with the camera module, the printed circuit structure may inevitably create some resistance towards the rotation of the camera module. Nonetheless, as described herein, the way how the printed circuit structure may be designed and how it may be arranged with respect to the camera module may allow at least one flexible portion of the printed circuit structure to be primarily twisted and placed in torsion during the rotation of the camera module. In comparison with other types of loading such as shear or bending, the twisting and placement of at least a portion of the printed circuit structure in torsion may allow the tip tilt camera module to actuate with the printed circuit structure exhibiting relatively low translational and torsional stiffness. Thus, the printed circuit structure may provide increased compliance to facilitate implementation of the tip and tilt functions for the camera module. Further, in some embodiments, the tip and tilt functions of the camera module may be implemented using one or more actuators. The actuators may receive one or more commands, and in response provide required actuation force to rotate the camera module to and maintain it at a specific tilt angle. The multi-bend dynamic flexible printed circuit (e.g., the U-shape first flexible portion) may increase compliance due to low translational and torsional stiffnesses. This reduces the energy and power required to actuate the camera module to stabilize and focus on images by lowering the resistive spring forces from the flexible printed circuit. As a result, the power consumption of the tilt actuators may also decreased. This can further reduce the size of the actuators and the overall footprint of the device through the device requiring smaller forces to actuate which reduces size as well as mass. Moreover, the use of flexible printed circuit(s) may allow for larger camera tip and tilt angles and thus larger OIS compensation. Increased OIS compensation from a tip tilt camera module may enable improved image stabilization in response to larger disturbances without distortion due to the image sensor movement within an autofocus camera module.

FIG. 1 shows an example device including a tip tilt camera module and a printed circuit structure, according to some embodiments. For purposes of illustration, only relevant components are shown in the figure. As indicated in FIG. 1, in some embodiments, device 100 may include camera module 105. In some embodiments, camera module 105 may include one or more lenses and an image sensor (not shown) as part of camera module 105. For purposes of illustration, a coordinate system defined by X-Y-Z axes is displayed in FIG. 1, whereby an optical axis of the one or more lenses of camera module 105 may be defined as the Z-axis. In some embodiments, the optical axis may correspond to the transmission path of a principal light ray passing through the lenses to the image sensor. In some embodiments, the transmission path of the principal light ray within camera module 105 may not necessary be a straight but rather a folded line, e.g., when camera module 105 includes a light folding element as part of the one or more lenses that may change the transmission direction of the principal light ray. In that case, the optical axis may refer to any straight part of the folded line. During operations of camera module 105, the lenses may pass light to the image sensor that may in turn generate image signals, e.g., electrical signals, based on the light. The image signals may be transmitted to a processor for further processing to generate an image. In some embodiments, the relative position between the lenses and the image sensor within camera module 105 may be adjustable along one or more axes. For instance, the relative position may be adjusted by moving the lenses and/or the image sensor relative to each other along the corresponding one or more axes, e.g., using one or more actuators. In some embodiments, a focal distance between the lenses and image sensor may be adjustable along the optical axis (e.g., Z-axis) to implement an AF function. In addition, in some embodiments, the lenses and/or the image sensor may be movable laterally along one or more axes (e.g., X- and/or Y-axis) orthogonal to the optical axis (e.g., Z-axis) to perform an OIS function. Of course, in some other embodiments, the lenses and the image sensor inside camera module 105 may be fixed relative to one another. As indicated in FIG. 1, in some embodiments, camera module 105 may be enclosed in a housing which may be further covered by shield can 125 and spacer 127. In some embodiments, spacer 127 may be attached to shield can 125 that may stay fixed during rotation of camera module 105. In some embodiments, spacer 127 and/or shield can 125 may be used as a "mounting plate" to hold one or more other components, such as component(s) of an actuator as described below.

In some embodiments, camera module 105 may be suspended from stationary base structure 110 via one or more stages such that camera module 105 as a whole may rotate, e.g., relative to stationary base structure 110 around one or more axes (e.g., X- and/or Y-axis) orthogonal to the optical axis (e.g., Z-axis). For instance, in some embodiments, the one or more stages may include Y-axis stage 115 that may be suspended from base structure 110 using one or more rolling elements 130. Y-axis stage 115 may be a structure (e.g., a plastic or metal structure) to function as a support to hold camera module 105 and other components (e.g., X-axis stage 120). As described below, Y-axis structure 115 may be considered an "interface" between the movable camera module 105 (and the other components) and the stationary base structure 110. Y-axis stage 115 may be used to enable the rotation of camera module 105 around one axis (e.g., Y-axis). In some embodiments, Y-axis stage 115 and base structure 110 may respectively include grooves 135 and 137 that in pair may form a curved raceway within which rolling elements 130 may roll. As a result, Y-axis stage 115 may move on rolling elements 130 to rotate around Y-axis relative to base structure 110, e.g., primarily on the X-Z plane. In addition, in some embodiments, the one or more stages may also include X-axis stage 120. Similarly, X-axis stage 120 may include a structure that may be suspended from Y-axis stage 115 using one or more rolling elements 140. For instance, in some embodiments, X-axis stage 120 may include one or more portions protruding from the side walls of the housing of camera module 120, as indicated in FIG. 1. One primary purpose of X-axis stage 120 may be to implement the rotation of camera module 105 around another axis (e.g., X-axis). In some embodiments, X-axis stage 120 and Y-axis stage 115 may respectively include grooves 138 and 139 to form a curved raceway for rolling elements 140 to move. Accordingly, X-axis stage 120 may move on rolling elements 140 rotate relative to Y-axis stage 115 around X-axis, e.g., primarily on the Y-Z plane. In addition, when Y-axis 115 rotates around Y-axis, X-axis stage 120 may be dragged to rotate together with Y-axis stage 115 around Y-axis relative to base structure 110 as well. In other words, Y-axis stage 115 and X-axis stage 120 may essentially form a gimbal system that may provide rotational degrees of freedom around the Y- and/or X-axis. Finally, camera module 105 may be affixed with X-axis stage 120 such that, by controlling the rotation of Y-axis stage 115 and X-axis stage 120, camera module 105 may be rotated around Y-axis and/or X-axis relative to a stationary reference point such as base structure 110 to a desired angle. During the rotation of camera module 105, both the lenses and the image sensor within camera module 105 may both tip and tilt (together). In some embodiments, during the rotation of camera module 105, the relative position between the lenses and the image sensor within camera module 105 may stay fixed. In some embodiments, as described above, the relative position between the lenses and the image sensor may be also adjustable during the rotation of camera module 105. Note that FIG. 1 is only presented as an example for purposes of illustration and shall not limit the scope of the disclosure. For instance, in some embodiments, the stack-up order of Y-axis 115 stage and X-axis stage 120 may be different. For instance, in some embodiments, X-axis stage 120 may be suspended from base structure 110, whilst Y-axis stage 115 may be stacked on top of X-axis stage 120 and camera module 105 may be affixed with Y-axis stage 115.

In some embodiments, device 100 may use preload magnet 145 and preload metallic plate 147 to stabilize camera module 105 and limits its movement relative to base structure 110 along Z-axis. For instance, in this example, preload magnet 145 may be attached to camera module 105, e.g., underneath camera module 105 along Z-axis, whilst preload plate 147 may be attached to base structure 110 facing preload magnet 145. As a result, the magnetic attraction between preload magnet 145 and preload plate 147 may force camera module 105 to be kind of "attached" to base structure 110 and thus be refrained from significant movement along Z-axis.

In some embodiments, the rotation of Y-axis 115 and X-axis 120 may be controlled using one or more actuators. In some embodiments, the actuators may be implemented using voice coil motor (VCM) actuators. In some embodiments, the actuators may include one or more magnets 150 and corresponding one or more coils 152. Within a pair of magnet 150 and coil 152, one may be attached to a relatively moving object whilst the other to a relatively stationary object. For instance, in some embodiments, for Y-axis actuation, a pair of magnet and coil may be affixed respectively to Y-axis stage 115 and base structure 110, and for X-axis actuation, another pair of magnet and coil may be respectively attached to X-axis stage 120 and spacer 127. The current flowing through coils 152 may be regulated, such that the current may interact with the magnetic field of magnets 150 to generate controllable motive force (e.g., Lorentz force) to rotate the relatively moving object with respect to the relatively stationary object around a corresponding axis (e.g., Y-axis or X-axis), such that camera module 105 may be controlled to tilt to a desired angle. Note that in some embodiments, the actuators for rotating camera module 105 may be separate ones from the actuators described above for relative position adjustment between the lenses and image sensor within camera module 105. Further, in some embodiments, there may be coordinated control of the actuators for tilting camera module 105 and the actuators for relative position adjustment within camera module 105.

As described above, in some embodiments, it may be needed to transfer electrical signals between camera module 105 and one or more other components outside camera module 105. In some embodiments, the electrical signals may include power, ground, image signals, tip or tilt control signals, sensing and/or feedback signals. Thus, as indicated in FIG. 1, device 100 may use printed circuit structure 160 that may include one or more dynamic flexible printed circuits to implement transfer of the electrical signals between camera module 105 and outside components, according to some embodiments. In some embodiments, printed circuit structure 160 may include a first flexible portion 165, a second flexible portion 170, and a third portion 175 that may be flexible or rigid. In some embodiments, printed circuit structure 160 including the first, second and third portions 165-175 may be formed using one single piece of a flexible printed circuit. In some embodiments, a flexible portion and a rigid portion may respectively refer to a flexible printed circuit and a rigid printed circuit. The flexible and rigid printed circuits may be formed using any appropriate technologies. For instance, a flexible printed circuit may be formed using one or more layers of electrical traces (e.g., copper traces), insulated with each other by an intermediate insulation layer, bonded to a flexible substrate (e.g., a flexible polyimide substrate) using adhesives. By comparison, a rigid printed circuit may comprise a rigid substrate (e.g., a rigid substrate formed based on polyimide, ajinomoto build-up film (ABF), ceramic and/or other materials) with one or more individually-insulated electrical trace layers attached to it.

In some embodiments, the first flexible portion 165 may be arranged to surround an outside perimeter of camera module 105 along one or more axes (e.g., X- and/or Y-axis) orthogonal to the optical axis (e.g., Z-axis). For instance, as indicated in FIG. 1, the first flexible portion 165 may be formed into a multi-bend geometry, such as a U-shape, wrapping around three side walls of the housing of camera module 105 from outside along X- and/or Y-axis, according to some embodiments. In other words, the first flexible portion 165 may surround the entire camera module 105 from outside, not one or more individual components (e.g., the lenses and/or the image sensor) within camera module 105. In some embodiments, the second flexible portion 170 may be arranged to connect camera module 105 with the first flexible portion 165 of printed circuit structure 160. For instance, one portion of the second flexible portion 170 may be attached to camera module 105, whilst another portion connected with the first flexible portion 165. In some embodiments, the attachment of the second flexible portion 170 with camera module 105 may be implemented using ACF. For instance, the second flexible portion 170 may include one or more electrical connection pads 172, whilst camera module 105 may include a component (e.g., a printed circuit board or substrate within camera module 105) having one or more corresponding electrical connection pads. Thus, the electrical connection pads of the second flexible portion 170 and camera module 105 may be "glued" together using an ACF tape. Given that the ACF is a film-type conductive adhesive, it may electrically and mechanically connect the second flexible portion 170 with camera module 105. In some embodiments, the first and second flexible portions 165 and 170 of circuit structure 160 may be one single flexible printed circuit, or may be two or more separate flexible printed circuits electrically and mechanically joined altogether (e.g., using ACF). As a result, the second flexible portion 170 may connect camera module 105, electrically and mechanically, with the first flexible portion 165 of printed circuit structure 160. In addition, because one portion of the second flexible portion 170 is attached with a rigid or stiff component within camera module 105, at least that portion of the second flexible portion 170 at the attachment may be considered rigidly connected with and thus move together with camera module 105 during rotation of camera module 105.

In some embodiments, the third portion 175 of printed circuit structure 160 may be used to connect a stationary portion of device 100, electrically and mechanically, with the first flexible portion 165 and ultimately to camera module 105 through the second flexible portion 170 of printed circuit structure 160. In some embodiments, the stationary portion may be a fixed flexible printed circuit, an electrical I/O interface, or one or more other fixed components outside camera module 105. In some embodiments, given the third portion 175 is rigidly attached to a fixed portion outside camera module 105, at least that portion of the third portion 175 at the attachment may stay fixed during rotation of camera module 105. In some embodiments, the first, second and third portions 165, 170 and 175 (e.g., when it is a flexible printed circuit) may be one single integral flexible printed circuit, or alternatively the third portion 175 (e.g., when it is a rigid printed circuit or a separate flexible printed circuit) may be a separate printed circuit joined with the first flexible portion 165 (e.g., using ACF). Thus, printed circuit structure 160, including the first, second and third portions 165-175, may form an electrical and mechanical connection between camera module 105 and the stationary portion outside camera module 105. Hence, electrical signals may be routed from/to camera module 105 through printed circuit structure 160 to/from the stationary portion, and further from/to the stationary portion to/from the one or more other components of device 100 outside camera module 105.

Figure 2:
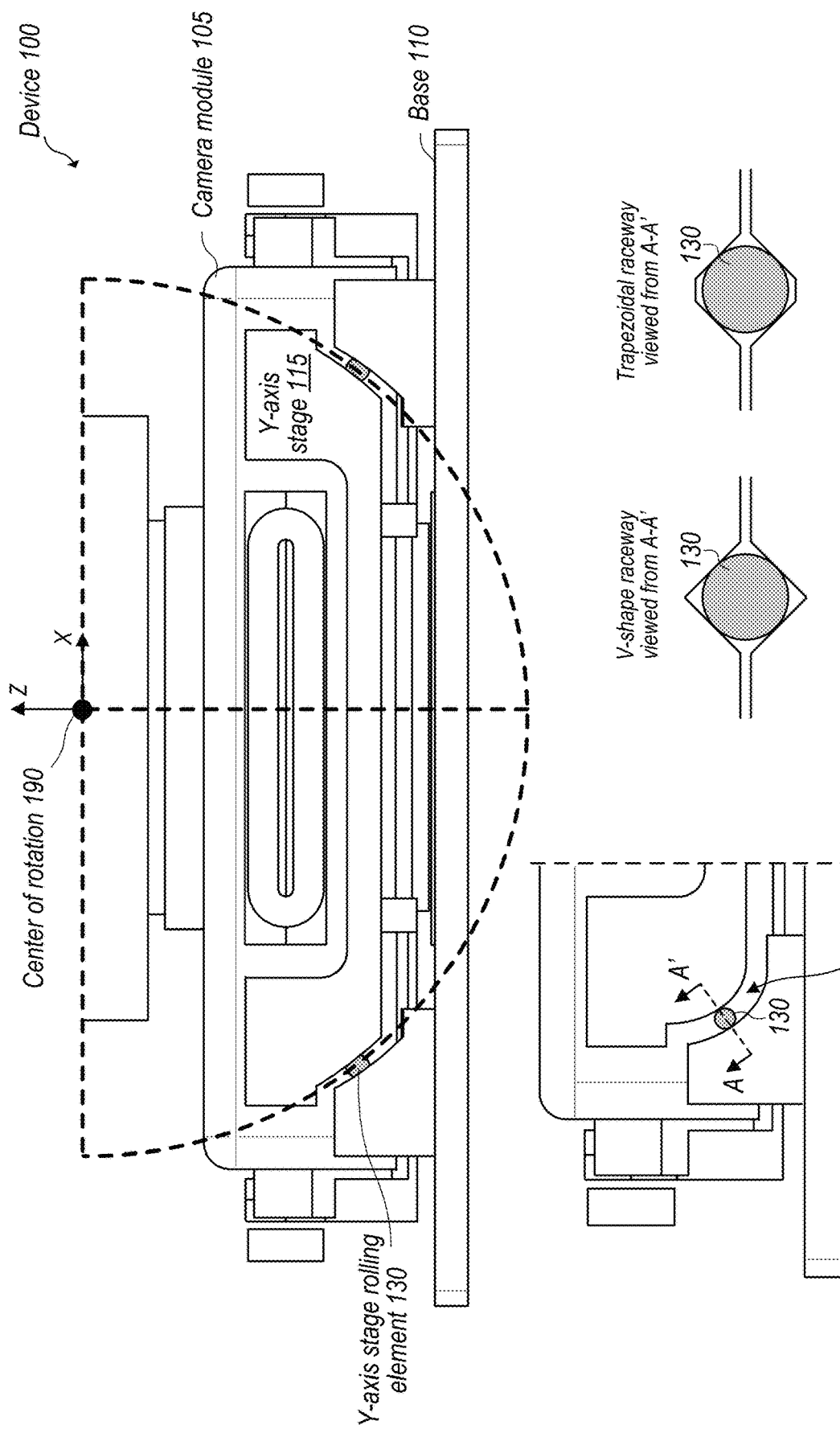
FIG. 2 shows a cross-sectional view of an example device including a tip tilt camera module and printed circuit structure, according to some embodiments.

FIG. 2 shows a corresponding cross-sectional view of device 100, according to some embodiments. As shown in FIG. 2, camera module 105 of device 100 may be suspended from base structure 110, e.g., using Y-axis stage 115. As indicated in FIG. 2, Y-axis stage 115 and base structure 110 may individually include grooves to form raceway 185 for rolling elements 130, e.g., on the X-Z plane. In some embodiments, raceway 185 may be a curved or arced raceway centered at rotation center 190, as indicated by the dashed lines and zoomed view in FIG. 2. Thus, Y-axis stage 115 (and camera module 105) may move on rolling elements 130 (rolling inside the curved or arced raceway) to rotate around Y-axis, e.g., primarily on the X-Z plane. In some embodiments, rotation center 190 of curved raceway 185 may be located at the top of the lenses of camera module 105 to minimize lenses motion during actuation. In some embodiments, rolling elements 130 may be balls or rollers (also called needles). In addition, in the cross-sectional view from A-A' raceway 185 for rolling elements 130 may be in a V-shape, a trapezoidal shape, or other shapes. In some embodiments, the raceway and rolling elements 140 of X-axis stage 120 may be implemented similarly, except that they may allow X-axis 120 and camera module 105 to rotate around X-axis primarily on the Y-Z plane.

Figure 3A:
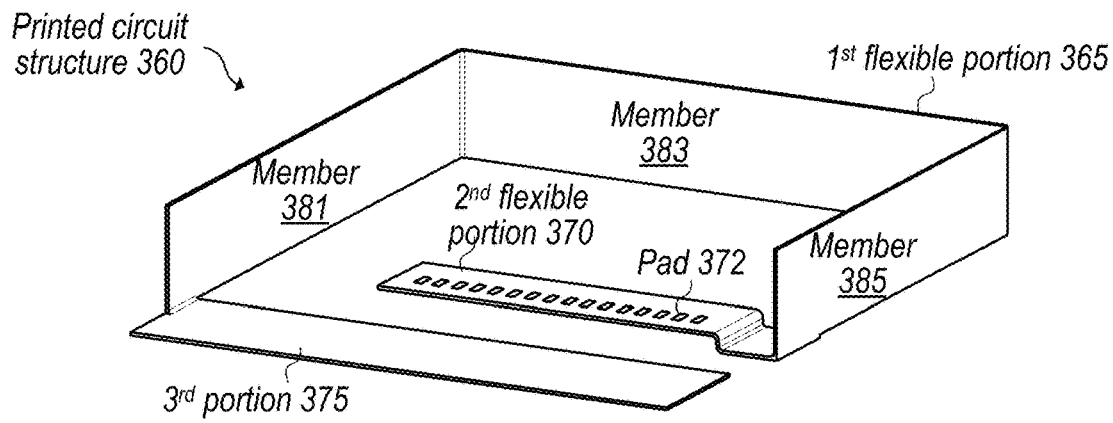
FIGS. 3A-3C show an example printed circuit structure, according to some embodiments.
Figure 3B:
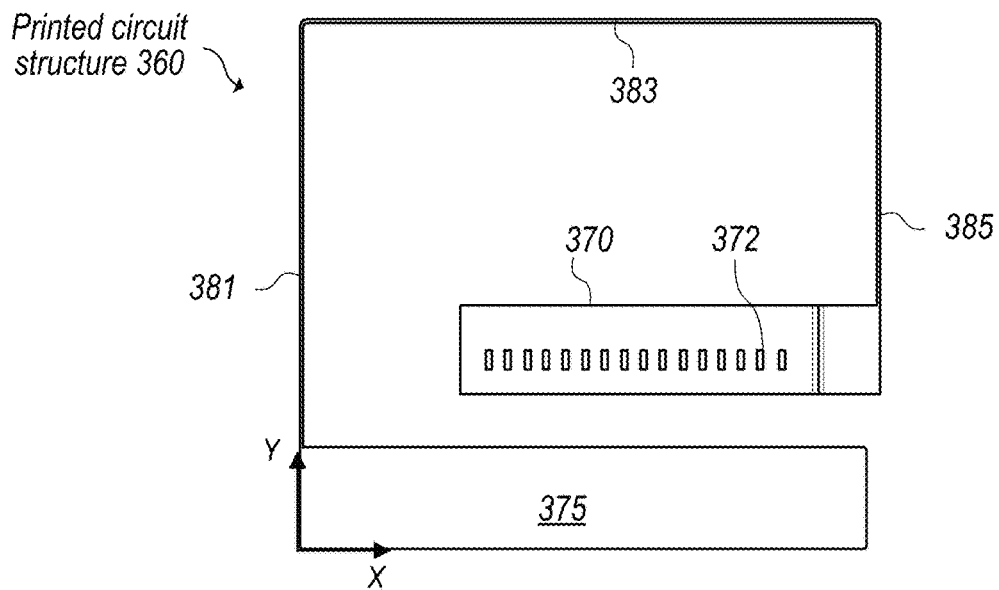
Figure 3C:
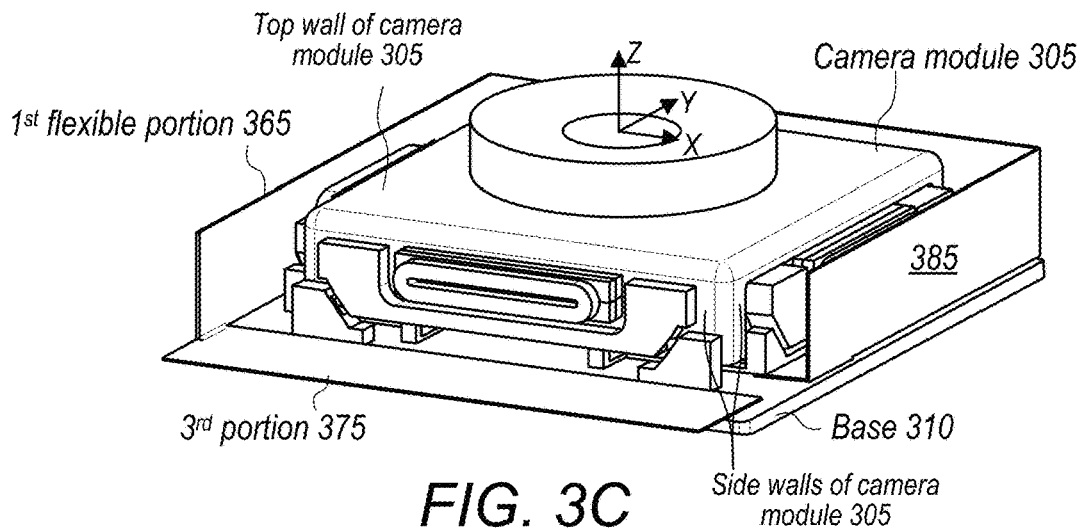

FIGS. 3A-3C show an example printed circuit structure, according to some embodiments. FIG. 3A shows a perspective view of the printed circuit structure, FIG. 3B is the corresponding top view of the printed circuit structure, and FIG. 3C shows the printed circuit structure after it is assembled with a camera module. In FIG. 3A, printed circuit structure 360 may include a first flexible portion 365, a second flexible portion 370, and a third portion 375, according to some embodiments. In some embodiments, the first flexible portion 365 may be arranged in an orientation on one or more planes (e.g., X-Z and/or Y-Z plane) in parallel to the optical axis (e.g., Z-axis) of camera module 305. For instance, in FIG. 3A, the first flexible portion 365 may be arranged vertically to be parallel with the Z-axis. In some embodiments, the first flexible portion 365 may be arranged to surround an outside perimeter of camera module 305. For instance, as indicated in FIGS. 3A-3C, camera module 305 may be enclosed inside a housing, and the first flexible portion 365 may be bent into a U-shape, including three members 381-385, wrapping around three outside side walls of the housing of camera module 305.

In some embodiments, the second flexible portion 370 may be connected with the first flexible portion 365, e.g., with member 385 of the first flexible portion 365. As described above, in some embodiments, the second flexible portion 370 and the first flexible portion 365 may be one integral flexible printed circuit, or separate flexible printed circuits joined altogether. Alternatively, the second portion 370 may be a rigid or rigid-flex printed circuit. In addition, in some embodiments, the second flexible portion 370 may be connected with the first flexible 365 proximate an opening of the U-shape of the first flexible portion 365. For instance, the second flexible portion 370 may be connected with member 385 at an end close the opening of the U-shape, rather than the other end close to member 383. In some embodiments, the second flexible portion 370 may be arranged in an orientation on a plane (e.g., the X-Y plane) orthogonal to the optical axis of camera module 305 (e.g., Z-axis). For instance, in FIG. 3A, the second flexible portion 370 is displayed to lay horizontally. In some embodiments, the second flexible portion 370 may protrude from the first flexible portion 365 (e.g., from member 385), e.g., towards another portion of the first flexible portion 365 (e.g., towards member 381) along one axis (e.g., X-axis) orthogonal to the optical axis (e.g., Z-axis). In some embodiments, the second flexible portion 370 may include one or more electrical connection pads 372. In some embodiments, the second flexible portion 370 may be positioned proximate a first surface of camera module 305 facing base structure 310. For instance, in this example, the second flexible portion 370 may be placed behind camera 305 along Z-axis, e.g., underneath camera module 305, after assembly with camera module 305 as shown in FIG. 3C. In this case, camera module 305 may have an opening underneath to allow the second flexible portion 370 to access inside camera module 305 to be attached with a corresponding component within camera module 305. Note that the second flexible portion 370 may or may not include the bend as shown in FIG. 3A. In this example, the bend is displayed to allow the second flexible portion 370 to circumvent the outside housing of camera module 305 to reach the underneath opening. Given that the second flexible portion 370 is attached with camera module 305, the second flexible portion 370 may move together with camera module 305 during rotation of camera module 305.

In some embodiments, the third portion 375 of printed circuit structure 360 may be outside camera module 305 and connected with the first flexible portion 365, e.g., with member 381 of the first flexible portion 365. As described above, in some embodiments, the third portion 375 may be a flexible or a rigid printed circuit. In addition, the third portion 375 may be an integral part of the first flexible portion 365 (e.g., when the third portion is a flexible printed circuit), or a separate printed circuit (flexible or rigid) but joined with the first flexible portion 365. In some embodiments, printed circuit structure 360 including the first, second and third portions may be one single flexible printed circuit. In some embodiments, the third portion 375 may be connected with the first flexible 365 proximate an opening of the U-shape of the first flexible portion 365. For instance, the third portion 375 may be connected with member 381 at an end close the opening of the U-shape, rather than the other end close to member 383. In some embodiments, the third portion 375 may be arranged in an orientation on a plane (e.g., the X-Y plane) orthogonal to the optical axis of camera module 305 (e.g., Z-axis). For instance, in FIG. 3A, the third portion 375 is displayed to be arranged horizontally, in parallel to the second flexible portion 370. In addition, in some embodiments, the third portion 375 may protrude from the first flexible portion 365 (e.g., from member 381), e.g., towards another portion of the U-shape (e.g., towards member 385) along one axis (e.g., X-axis) orthogonal to the optical axis (e.g., Z-axis) in an opposite direction to the protrusion of the second flexible portion 370. As indicated in FIG. 3C, in some embodiments, the third portion 375 may be rigidly attached with a stationary component outside camera module 305 such that the third portion 375 may stay fixed during rotation of camera module 305.

Figure 4:
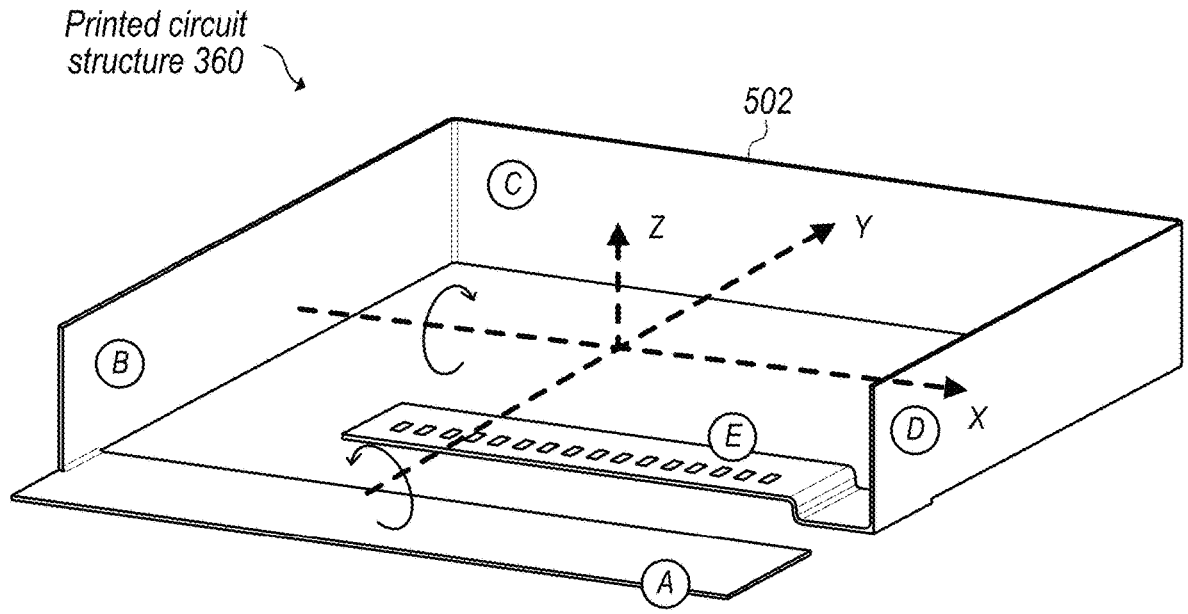
FIG. 4 shows the type of loading that each member of an example printed circuit structure experiences during rotation of a camera module, according to some embodiments.

FIG. 4 shows the type of loading that each member of an example printed circuit structure experiences during rotation of a camera module about the listed X and Y axes, according to some embodiments. For purposes of illustration, within printed circuit structure 360, the third portion 375, member 381 of the first flexible portion 365, member 383 of the first flexible portion 365, member 385 of the first flexible portion 365, and the second flexible portion 370 are respectively named as members A, B, C, D and E, as indicated in FIG. 4. The table in FIG. 4 shows corresponding loading on different members of printed circuit structure 360 during rotation of an associated camera module (e.g., camera module 305). As describe above in FIG. 3, member A may be attached with a stationary reference point (e.g., a fixed flexible printed circuit or an electrical I/O interface outside the camera module) and thus stay fixed during rotation of the camera module, whilst member E may be rigidly connected to and thus rotate together with the camera module. When the camera module rotates around X-axis, member C may be placed in torsion as it is twisted like a ribbon, as indicated in the table in FIG. 4. By comparison, members B and C may be placed in shear and rotate like that of a rigid body. For a flexible object like a piece of a flexible printed circuit, it may exhibit relatively low stiffness and resistance to torsion compared to other types of loading such as shear and bending. Thus, by placing member C in torsion, this may increase the compliance (e.g., a reciprocal of stiffness) of the dynamic flexible printed circuit 360 during rotation of the camera module. Similarly, when the camera module rotates around Y-axis, members B and D may be placed in torsion, whilst member C is loaded in shear. In short, for each rotational degree of freedom (e.g., around X- and/or Y-axis), during the rotation of the camera module, the U-shaped flexible geometry may allow at least one member of the printed circuit structure 360 to be placed in torsion to exhibit low stiffness and high compliance. As a result, this may reduce the resistance and increase the compliance of printed circuit structure 360 which may in turn facilitate power efficient rotation of an increasingly compact camera module.

Figure 5A:
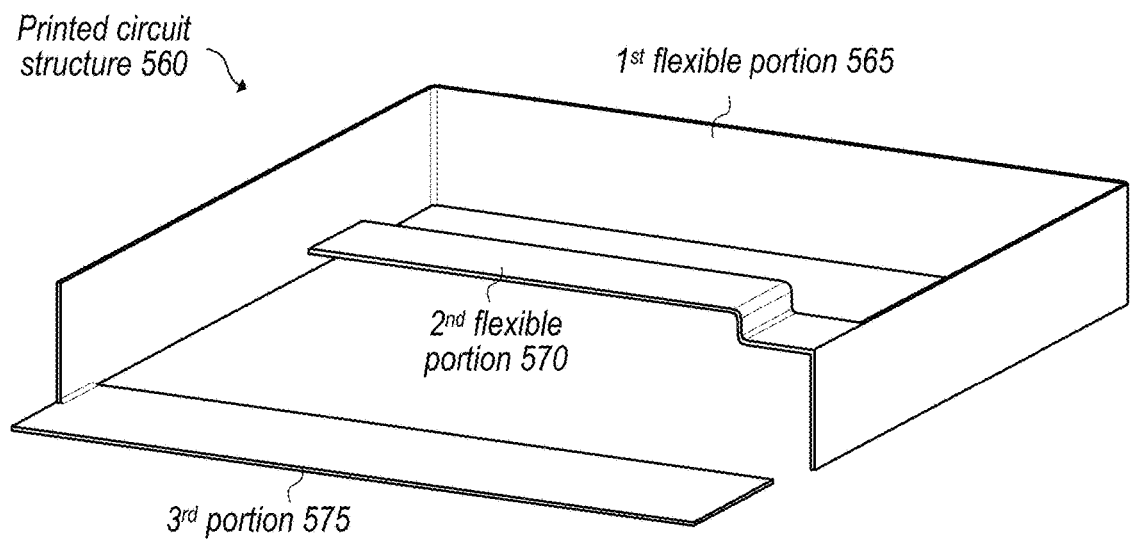
FIGS. 5A-5B show another example printed circuit structure, according to some embodiments.
Figure 5B:
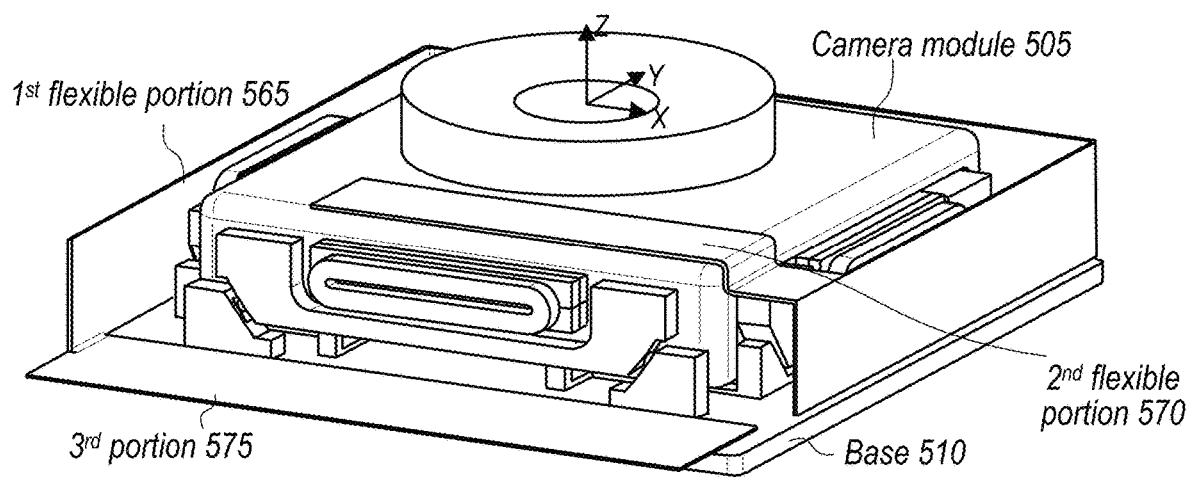

FIGS. 5A-5B show another example printed circuit structure before and after assembly with a camera module, according to some embodiments. As indicated in the figures, printed circuit structure 560 may include a first flexible portion 565, a second flexible portion 570, and a third portion 575, like printed circuit structure 360 in FIGS. 3-4. However, in some embodiments, the second flexible portion 570 may be positioned proximate a surface of camera module 505 opposite the surface that faces base structure 510. In other words, in this example, the second flexible portion 570 may be placed in front of camera 505 along the optical axis (or Z-axis), e.g., on top of camera 505 after the assembly as shown in FIG. 5B. Similar to printed circuit structure 360, the second flexible portion 570 of printed circuit structure 560 may be attached with camera module 505 to thus connect camera module 505, electrically and mechanically, with the first flexible portion 565 of printed circuit structure 560. For instance, camera module 505 may include an opening on top through which the second flexible portion 570 may get access for connection with at least one component within camera module 505.

Figure 6A:
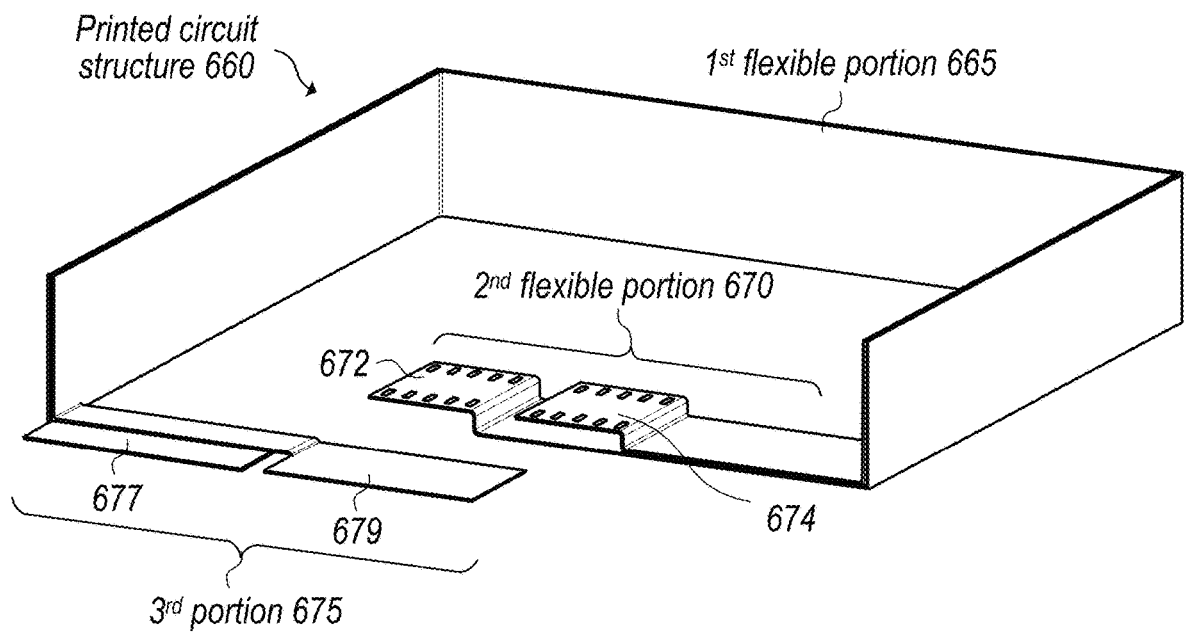
FIGS. 6A-6B show another example printed circuit structure for a camera module, according to some embodiments.
Figure 6B:
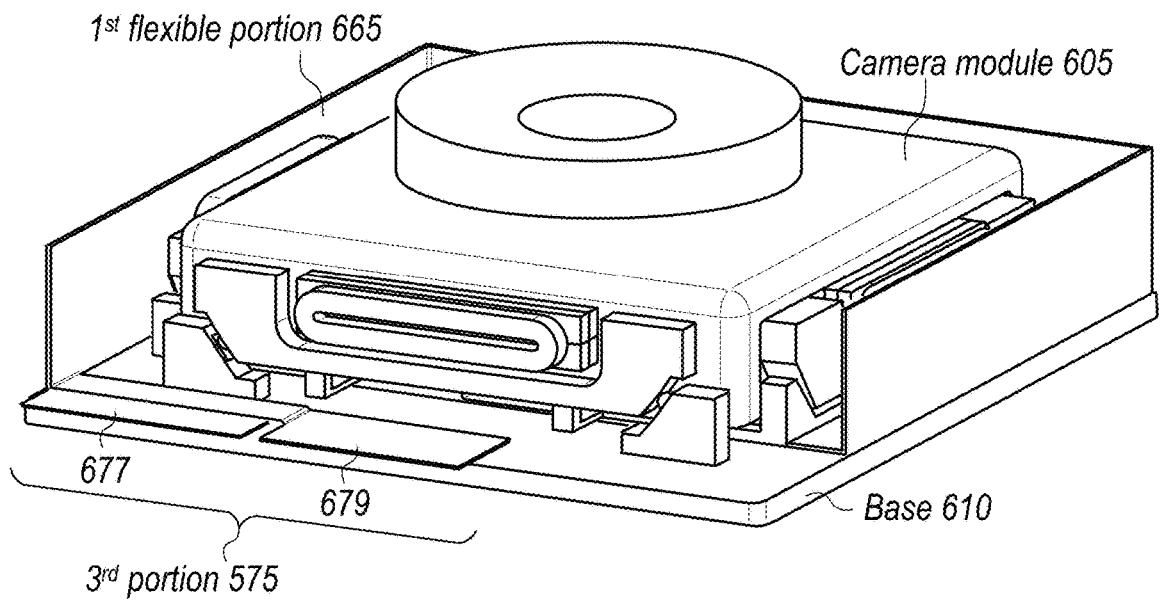

FIGS. 6A-6B show another example printed circuit structure for a camera module, according to some embodiments. As indicated in the figures, printed circuit structure 660 may include a first flexible portion 665, a second flexible portion 670, and a third portion 675, like printed circuit structures 360 and 560 in FIGS. 3-5. In addition, in some embodiments, the second flexible portion 670 may be positioned proximate a surface of camera module 605 facing base structure 610 (e.g., like FIGS. 3-4, underneath camera module 605 behind Z-axis), or proximate another surface opposite the surface facing base structure 610 (e.g., like FIG. 5, above camera module 605 in front of Z-axis). Further, in some embodiments, the second flexible portion 670 and/or the third portion 675 may individually include multiple printed circuits. For instance, as indicated in FIGS. 6A-6B, in some embodiments, the second flexible portion 670 may include two flexible printed circuits 672 and 674. In some embodiments, flexible printed circuits 672 and 674 may be stacked on top of each other. Flexible printed circuits 672 and 674 may or may not touch each other, but they may be electrically separate from each other and respectively carry electrical traces in parallel. Once flexible printed circuits 672 and 674 join the first flexible portion 665, the electrical traces may be aggregated and routed altogether through the first flexible portion 665. Compared to the single circuit design in FIGS. 3-5, the stack-up structure may allow for more electrical signals to be transferred through the second flexible portion 670 because flexible printed circuits 672 and 674 may be routed in parallel. In addition, the stack-up structure may decrease the thickness of each flexible printed circuit 672 and 674, compared to an otherwise single circuit design. This may further reduce the stiffness and resistance of printed circuit structure 660 to bending from tip and tilt actuation of camera module 605. Similarly, in some embodiments, the third portion 675 (a flexible or rigid portion) may have two printed circuits 677 and 679 (flexible or rigid) that may be stacked on top of each other.

Figure 7A:
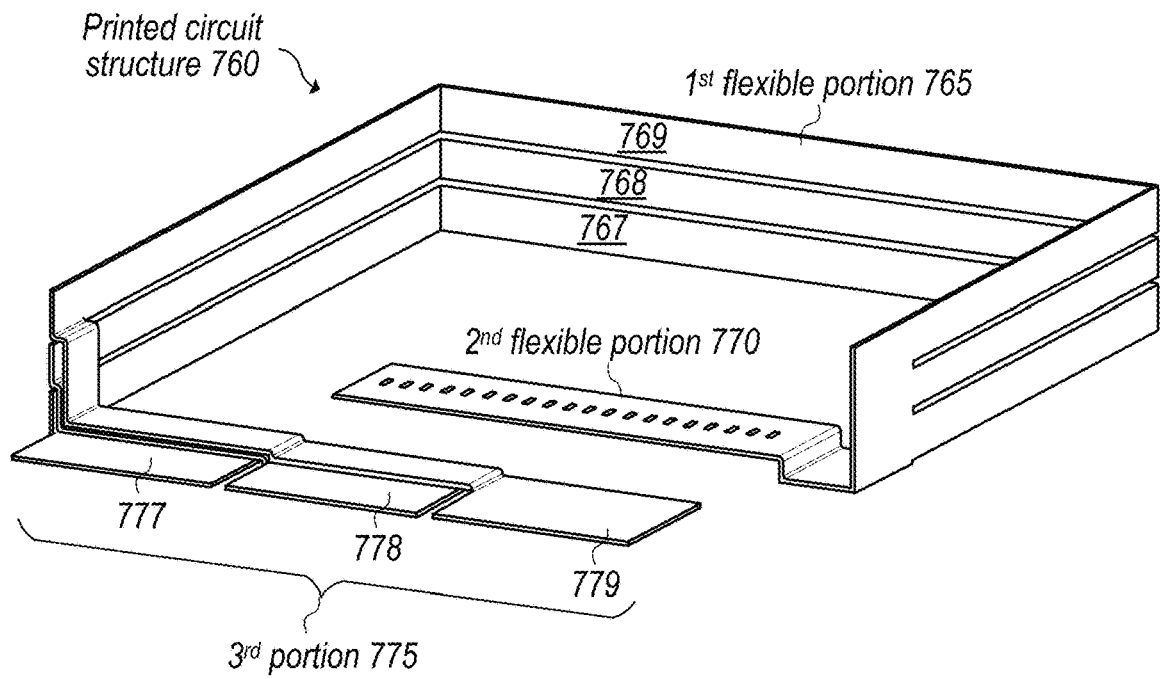
FIGS. 7A-7B show another example printed circuit structure for a camera module, according to some embodiments.
Figure 7B:
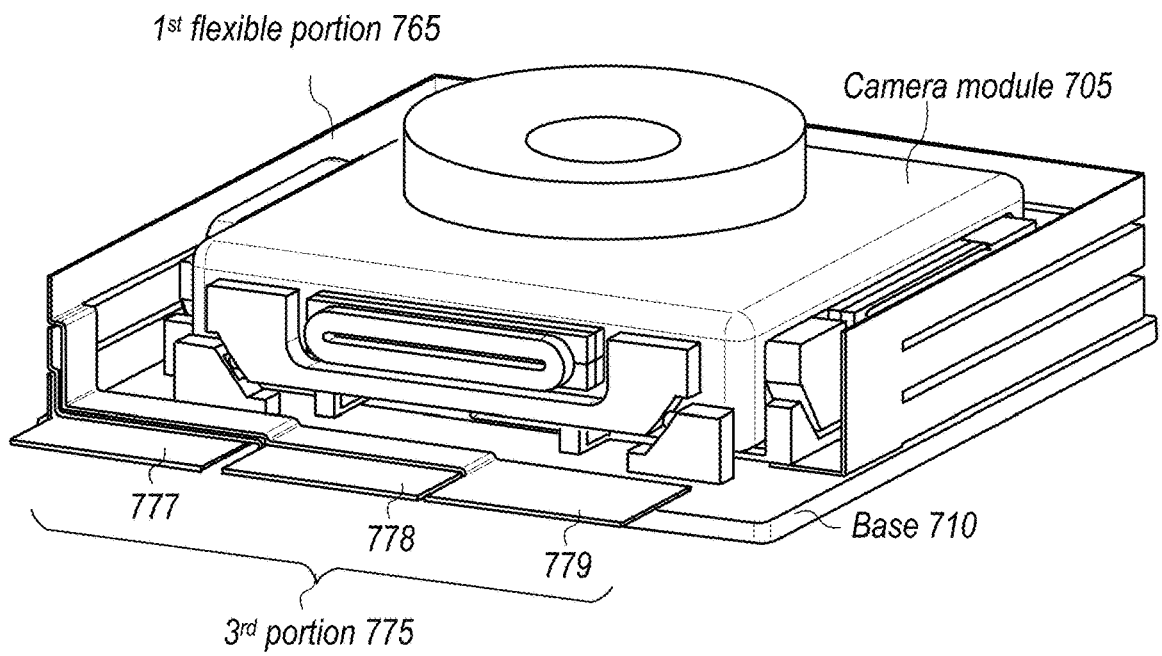

FIGS. 7A-7B show another example printed circuit structure for a camera module, according to some embodiments. As indicated in the figures, printed circuit structure 760 may include a first flexible portion 765, a second flexible portion 770, and a third portion 775, like printed circuit structures 360, 560 and 660 in FIGS. 3-6. Note that the second flexible portion 770 may be positioned proximate a surface of camera module 705 facing base structure 710 (e.g., like FIGS. 3-4), or proximate another surface opposite the surface facing base structure 710 (e.g., like FIG. 5), according to some embodiments. Further, like printed circuit structure 660 in FIG. 6, the second flexible portion 770 and/or the third portion 775 may individually include multiple printed circuits, in some embodiments. For instance, as indicated in FIGS. 7A-7B, the third portion 775 may include three (flexible or rigid) printed circuits 777, 778 and 779 that may be stacked on top of each other. In addition, in some embodiments, the first flexible portion 765 may also include multiple flexible printed circuits, e.g., 767, 768 and 769, that may be arranged spatially in parallel to each other and carry respective electrical traces separately. In some embodiments, flexible printed circuits 767-769 of the first flexible portion 765 may be mapped to (flexible or rigid) printed circuits 777-779 of the third portion 775 on-to-one, such that electrical traces of a printed circuit of the first flexible portion 765 may be routed through a corresponding printed circuit of the third portion 775. For instance, the electrical traces of flexible printed circuit 767 may be routed through printed circuit 777, the electrical traces of flexible printed circuit 768 through printed circuit 778, and the electrical traces of flexible printed circuit 769 through printed circuit 779. But note that the number of split flexible printed circuits within the first flexible portion 765 may not necessarily equal to the number of split printed circuits within the third portion 775. Further, even if they are the same, the distribution of the electrical traces between the two portions may not necessarily follow a one-to-one mapping. Rather, the traces may be allocated flexibly, as needed, in other manners. The split design of the first flexible portion 765 may reduce the height for each split section 767-769, compared to an otherwise single circuit design. This may reduce the torsional and bending stiffness in each split section relative to a singular sheet, non-split, flexible printed circuit. Decreasing the height, and thus stiffness, may increase the compliance and reduce the resistance to bending and torsion from tip and tilt actuation of camera module 705.

Figure 8:
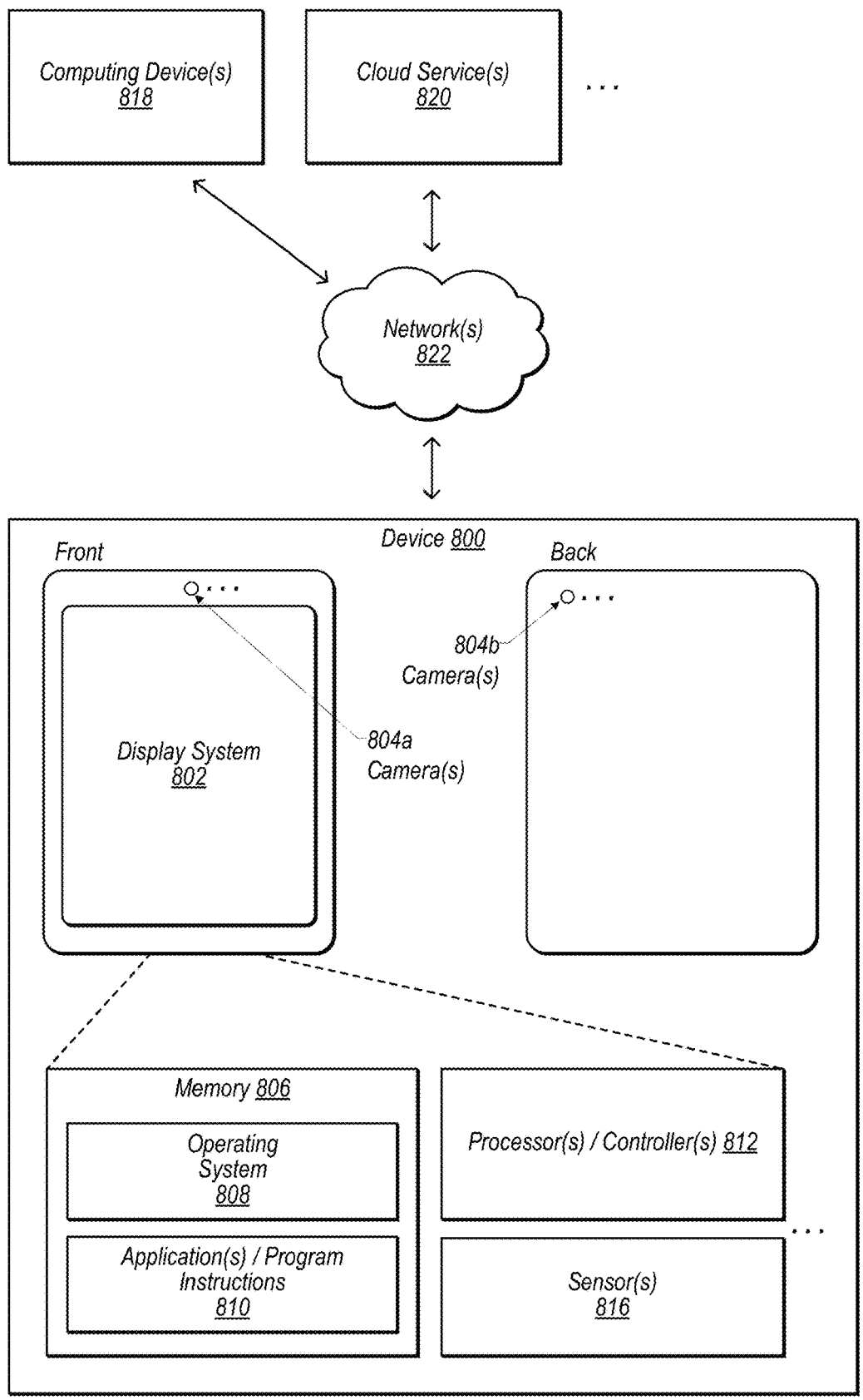
FIG. 8 shows a schematic representation of an example device that may use a printed circuit structure to facilitate implementation of tilt functions for a camera module, according to some embodiments.

FIG. 8 illustrates a schematic representation of an example device 800 (e.g., like device 100 in FIG. 1) that may a printed circuit structure to facilitate implementation of tilt functions for a camera module, e.g., as described herein with reference to FIGS. 1-7, according to some embodiments. In some embodiments, the device 800 may be a mobile device and/or a multifunction device. In various embodiments, the device 800 may be any of various types of devices, including, but not limited to, a personal computer system, desktop computer, laptop, notebook, tablet, slate, pad, or netbook computer, mainframe computer system, handheld computer, workstation, network computer, a camera, a set top box, a mobile device, an augmented reality (AR) and/or virtual reality (VR) headset, a consumer device, video game console, handheld video game device, application server, storage device, a television, a video recording device, a peripheral device such as a switch, modem, router, or in general any type of computing or electronic device.

In some embodiments, the device 800 may include a display system 802 (e.g., comprising a display and/or a touch-sensitive surface) and/or one or more cameras 804. In some non-limiting embodiments, the display system 802 and/or one or more front-facing cameras 804a may be provided at a front side of the device 800, e.g., as indicated in FIG. 8. Additionally, or alternatively, one or more rear-facing cameras 804b may be provided at a rear side of the device 800. In some embodiments comprising multiple cameras 804, some or all of the cameras may be the same as, or similar to, each other. Additionally, or alternatively, some or all of the cameras may be different from each other. In various embodiments, the location(s) and/or arrangement(s) of the camera(s) 804 may be different than those indicated in FIG. 8.

Among other things, the device 800 may include memory 806 (e.g., comprising an operating system 808 and/or application(s)/program instructions 810), one or more processors and/or controllers 812 (e.g., comprising CPU(s), memory controller(s), display controller(s), and/or camera controller(s), etc.), and/or one or more sensors 816 (e.g., orientation sensor(s), proximity sensor(s), and/or position sensor(s), etc.). In some embodiments, the device 800 may communicate with one or more other devices and/or services, such as computing device(s) 818, cloud service(s) 820, etc., via one or more networks 822. For example, the device 800 may include a network interface (e.g., network interface 910) that enables the device 800 to transmit data to, and receive data from, the network(s) 822. Additionally, or alternatively, the device 800 may be capable of communicating with other devices via wireless communication using any of a variety of communications standards, protocols, and/or technologies.

Figure 9:
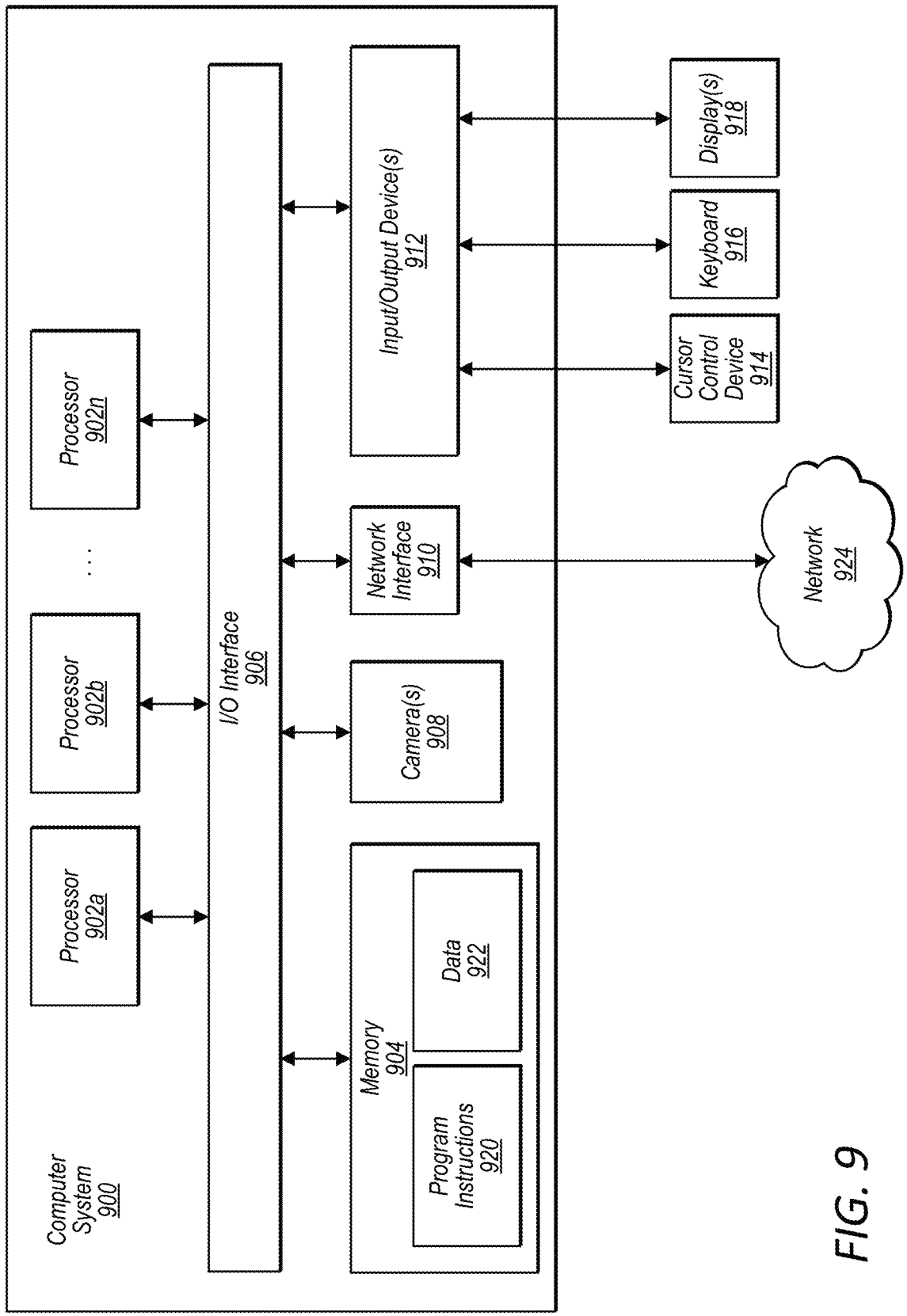
FIG. 9 shows a schematic block diagram of an example computer system that may use a printed circuit structure to facilitate implementation of tilt functions for a camera module, according to some embodiments.

FIG. 9 illustrates a schematic block diagram of an example computing device, referred to as computer system 900, that may include or host embodiments of a device using a printed circuit structure to facilitate implementation of tilt functions for a camera module, e.g., as described herein with reference to FIGS. 1-8, according to some embodiments. In addition, computer system 900 may implement methods for controlling operations of the camera and/or for performing image processing images captured with the camera. In some embodiments, the device 800 (described herein with reference to FIG. 8) may additionally, or alternatively, include some or all of the functional components of the computer system 900 described herein.

The computer system 900 may be configured to execute any or all of the embodiments described above. In different embodiments, computer system 900 may be any of various types of devices, including, but not limited to, a personal computer system, desktop computer, laptop, notebook, tablet, slate, pad, or netbook computer, mainframe computer system, handheld computer, workstation, network computer, a camera, a set top box, a mobile device, an augmented reality (AR) and/or virtual reality (VR) headset, a consumer device, video game console, handheld video game device, application server, storage device, a television, a video recording device, a peripheral device such as a switch, modem, router, or in general any type of computing or electronic device.

In the illustrated embodiment, computer system 900 includes one or more processors 902 coupled to a system memory 904 via an input/output (I/O) interface 906. Computer system 900 further includes one or more cameras 908 coupled to the I/O interface 906. Computer system 900 further includes a network interface 910 coupled to I/O interface 906, and one or more input/output devices 912, such as cursor control device 914, keyboard 916, and display(s) 918. In some cases, it is contemplated that embodiments may be implemented using a single instance of computer system 900, while in other embodiments multiple such systems, or multiple nodes making up computer system 900, may be configured to host different portions or instances of embodiments. For example, in one embodiment some elements may be implemented via one or more nodes of computer system 900 that are distinct from those nodes implementing other elements.

In various embodiments, computer system 900 may be a uniprocessor system including one processor 902, or a multiprocessor system including several processors 902 (e.g., two, four, eight, or another suitable number). Processors 902 may be any suitable processor capable of executing instructions. For example, in various embodiments processors 902 may be general-purpose or embedded processors implementing any of a variety of instruction set architectures (ISAs), such as the x86, PowerPC, SPARC, or MIPS ISAs, or any other suitable ISA. Also, in some embodiments, one or more of processors 902 may include additional types of processors, such as graphics processing units (GPUs), application specific integrated circuits (ASICs), etc. In multiprocessor systems, each of processors 902 may commonly, but not necessarily, implement the same ISA. In some embodiments, computer system 900 may be implemented as a system on a chip (SoC). For example, in some embodiments, processors 902, memory 904, I/O interface 906 (e.g. a fabric), etc. may be implemented in a single SoC comprising multiple components integrated into a single chip. For example, an SoC may include multiple CPU cores, a multi-core GPU, a multi-core neural engine, cache, one or more memories, etc. integrated into a single chip. In some embodiments, an SoC embodiment may implement a reduced instruction set computing (RISC) architecture, or any other suitable architecture.

System memory 904 may be configured to store program instructions 920 accessible by processor 902. In various embodiments, system memory 904 may be implemented using any suitable memory technology, such as static random access memory (SRAM), synchronous dynamic RAM (SDRAM), nonvolatile/Flash-type memory, or any other type of memory. Additionally, existing camera control data 922 of memory 904 may include any of the information or data structures described above. In some embodiments, program instructions 920 and/or data 922 may be received, sent or stored upon different types of computer-accessible media or on similar media separate from system memory 904 or computer system 900. In various embodiments, some or all of the functionality described herein may be implemented via such a computer system 900.

In one embodiment, I/O interface 906 may be configured to coordinate I/O traffic between processor 902, system memory 904, and any peripheral devices in the device, including network interface 910 or other peripheral interfaces, such as input/output devices 912. In some embodiments, I/O interface 906 may perform any necessary protocol, timing or other data transformations to convert data signals from one component (e.g., system memory 904) into a format suitable for use by another component (e.g., processor 902). In some embodiments, I/O interface 906 may include support for devices attached through various types of peripheral buses, such as a variant of the Peripheral Component Interconnect (PCI) bus standard or the Universal Serial Bus (USB) standard, for example. In some embodiments, the function of I/O interface 906 may be split into two or more separate components, such as a north bridge and a south bridge, for example. Also, in some embodiments some or all of the functionality of I/O interface 906, such as an interface to system memory 904, may be incorporated directly into processor 902.

Network interface 910 may be configured to allow data to be exchanged between computer system 900 and other devices attached to a network 924 (e.g., carrier or agent devices) or between nodes of computer system 900. Network 924 may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 910 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 912 may, in some embodiments, include one or more display terminals, keyboards, keypads, touchpads, scanning devices, voice or optical recognition devices, or any other devices suitable for entering or accessing data by one or more computer systems 900. Multiple input/output devices 912 may be present in computer system 900 or may be distributed on various nodes of computer system 900. In some embodiments, similar input/output devices may be separate from computer system 900 and may interact with one or more nodes of computer system 900 through a wired or wireless connection, such as over network interface 910.

Those skilled in the art will appreciate that computer system 900 is merely illustrative and is not intended to limit the scope of embodiments. In particular, the computer system and devices may include any combination of hardware or software that can perform the indicated functions, including computers, network devices, Internet appliances, PDAs, wireless phones, pagers, etc. Computer system 900 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 900 may be transmitted to computer system 900 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Generally speaking, a computer-accessible medium may include a non-transitory, computer-readable storage medium or memory medium such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. A system, comprising:
    a camera module including an image sensor and one or more lenses, wherein the camera module is suspended from a base structure via one or more stages and configured to rotate using the one or more stages relative to the base structure around one or more axes orthogonal to an optical axis of one or more lenses of the camera module; and
    a printed circuit structure, comprising:
        a first flexible portion surrounding an outside perimeter of the camera module along the one or more axes; and
        a second flexible portion attached to the camera module to connect the camera module with the first flexible portion of the printed circuit structure,
        wherein the printed circuit structure is configured to route one or more electrical signals through the printed circuit structure between the camera module and at least one component outside the camera module.

2. The system of claim 1, wherein the second flexible portion of the printed circuit structure is positioned proximate a first surface of the camera module facing the base structure.

3. The system of claim 1, wherein the second flexible portion of the printed circuit structure is positioned proximate a second surface of the camera module opposite a first surface facing the base structure.

4. The system of claim 1, wherein the attachment of second flexible portion with the camera module is implemented using anisotropic conductive film (ACF).

5. The system of claim 1, wherein the second flexible portion includes one flexible printed circuit or multiple flexible printed circuits stacked on top of each other.

6. The system of claim 1, wherein the first flexible portion of the printed circuit structure is formed in a U-shape.

7. The system of claim 6, wherein the first flexible portion of the printed circuit structure is arranged in an orientation on one or more planes in parallel to the optical axis of the one or more lenses of the camera module, and wherein at least one portion of the first flexible portion is placed in torsion during the rotation of the camera module.

8. The system of claim 6, wherein the second flexible portion of the printed circuit structure is arranged in an orientation on a plane orthogonal to the optical axis of the one or more lenses of the camera module, and wherein the second flexible portion is connected to a portion of the first flexible portion of the printed circuit structure proximate an opening of the U-shape of the first flexible portion of the printed circuit structure.

9. The system of claim 6, wherein the printed circuit structure further comprises a third flexible portion attached to a stationary component outside the camera module to connect the stationary component with the first flexible portion of the printed circuit structure.

10. The system of claim 9, wherein the printed circuit structure including the first, second and third portions is one single flexible printed circuit.

11. The system of claim 9, wherein the third portion of the printed circuit structure includes one printed circuit or multiple printed circuits stacked on top of each other.

12. The system of claim 9, wherein the third portion of the printed circuit structure is arranged in an orientation on a plane orthogonal to the optical axis of the one or more lenses of the camera module, and wherein the third portion is connected to another portion of the first flexible portion of the printed circuit structure proximate an opening of the U-shape of the first flexible portion of the printed circuit structure.

13. The system of claim 1, wherein the first flexible portion of the printed circuit structure includes one printed circuit or multiple printed circuits.

14. The system of claim 1, wherein a relative position between the image sensor and the one or more lenses of the camera module is adjustable.

15. A device, comprising:
    a camera module including an image sensor and one or more lenses, wherein the camera module is configured to rotate around one or more axes;
    one or more components outside the camera module; and
    a printed circuit structure, comprising:
        a first flexible portion surrounding an outside perimeter of the camera module; and
        a second flexible portion attached to the camera module to connect the camera module with the first flexible portion of the printed circuit structure,
        wherein the printed circuit structure is configured to transmit one or more electrical signals through the printed circuit structure between the camera module and the one or more components outside the camera module.

16. The device of claim 15, wherein the second flexible portion of the printed circuit structure is positioned proximate a first surface of the camera module facing the base structure, or a proximate a second surface of the camera module opposite the first surface of the camera module.

17. The device of claim 15, wherein the first flexible portion of the printed circuit structure is formed in a U-shape, and wherein at least one portion of the first flexible portion is placed in torsion during the rotation of the camera module.

18. The device of claim 15, wherein the printed circuit structure further comprises a third portion attached to a stationary component outside the camera module to connect the stationary component with the first flexible portion of the printed circuit structure.

19. A device, comprising:
    a camera module including an image sensor and one or more lenses, wherein the camera module is configured to rotate around one or more axes;
    a processor outside the camera module and configured to process image signals generated from the camera module; and
    a printed circuit structure configured to provide an electrical connection between the camera module the processor, wherein the printed circuit structure includes a first flexible portion in a U-shape surrounding an outside perimeter of the camera module at least one portion of which is placed in torsion during the rotation of the camera module.

20. The device of claim 19, wherein the printed circuit structure further comprises:
- a second flexible portion attached to the camera module to connect the camera module with the first flexible portion of the printed circuit structure; and
- a third portion rigidly connected to a stationary component outside the camera module to connect the first flexible portion of the printed circuit structure and one or more electrical traces to the processor.

* * * * *